March 1, 1966
F. R. TORREY ETAL
3,237,599
ANIMAL CARE CASE
Filed Sept. 25, 1964
2 Sheets-Sheet 1
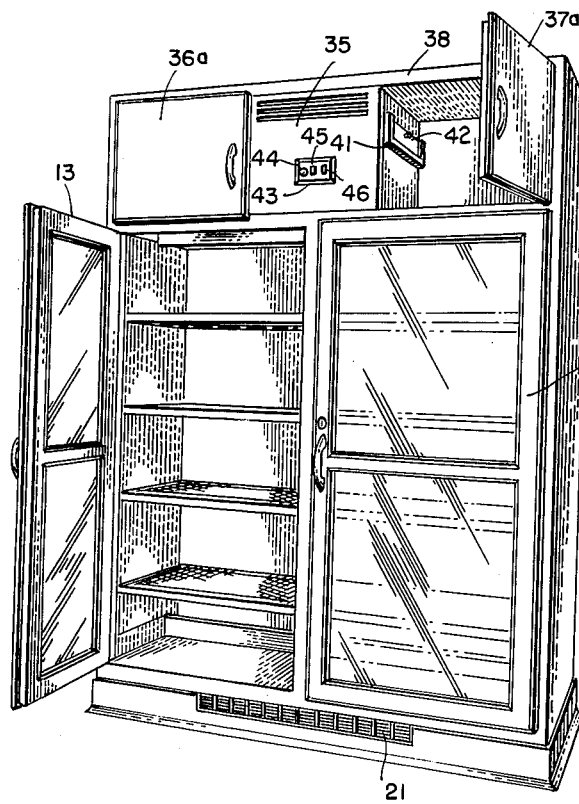
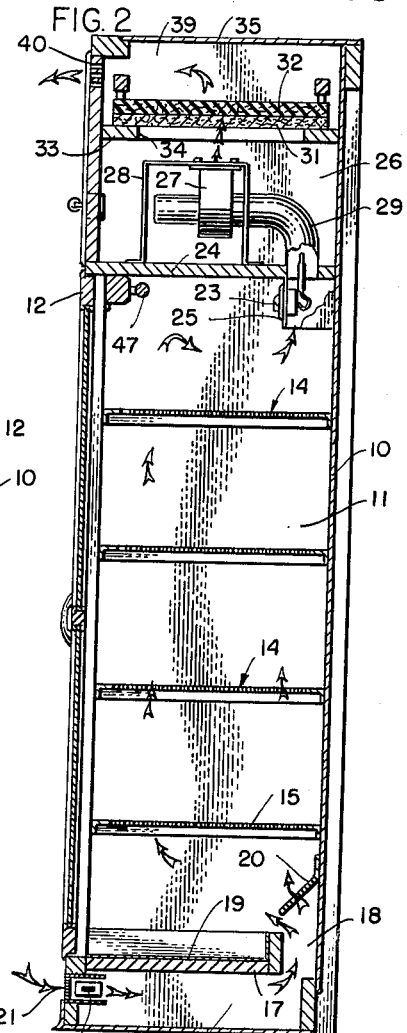
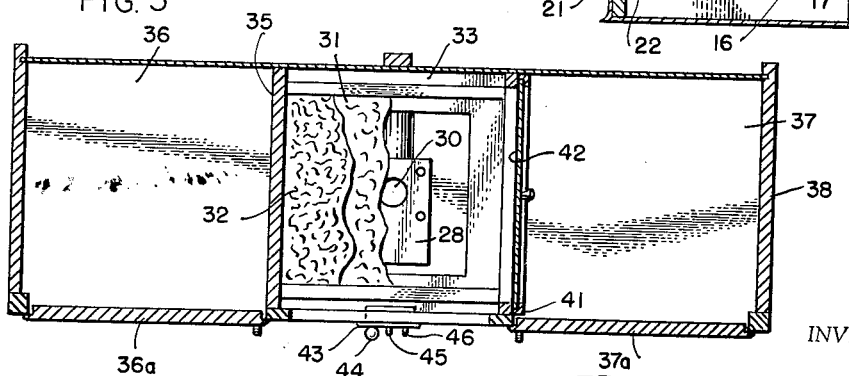
WITNESS
Harry S. Brown Jr.
INVENTOR
FRANK R. TORREY
ARTHUR W. CARLSON
BY
Dawson, Tilton, Fallon, Lungmus & Alexander
ATTORNEY

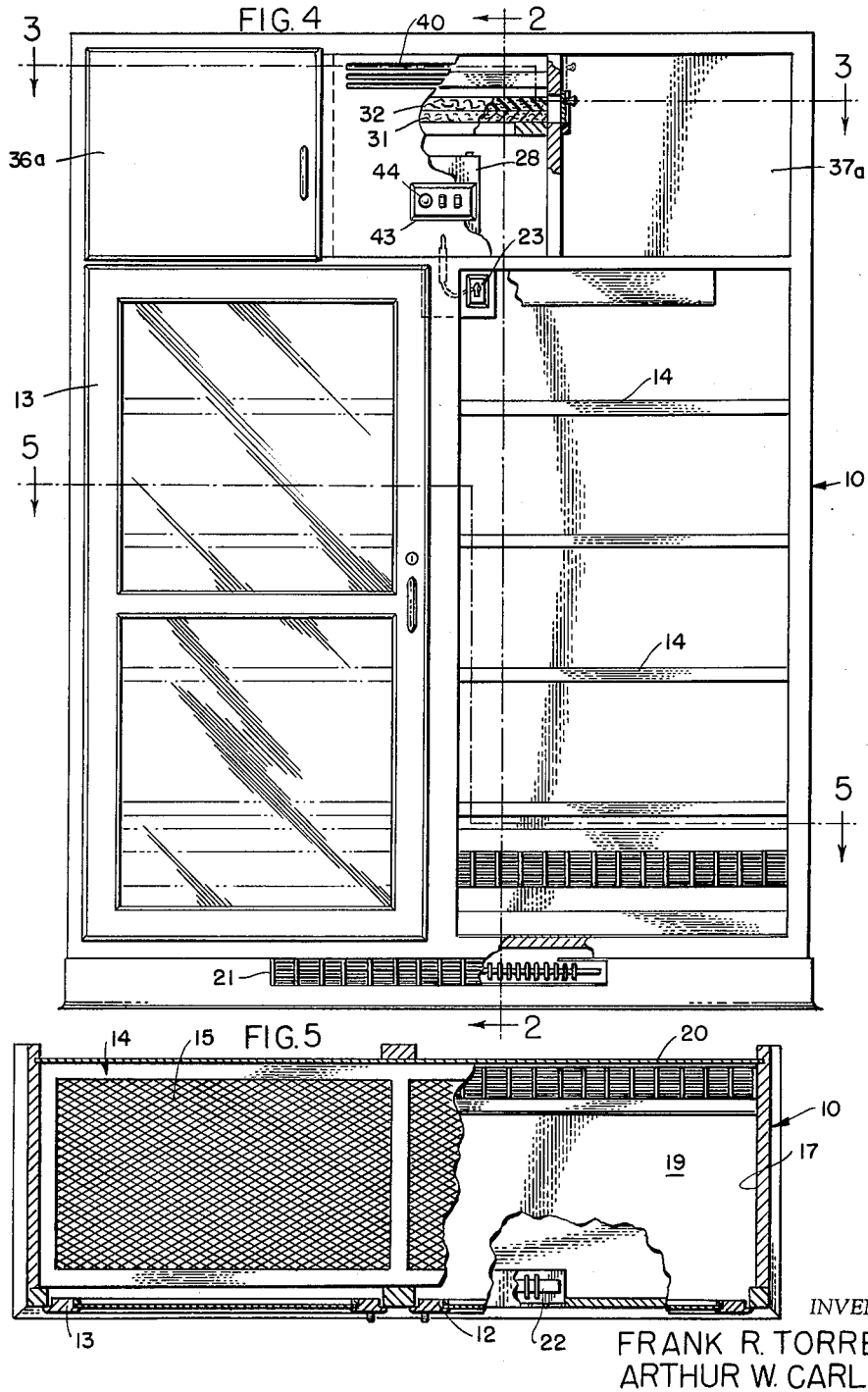

United States Patent Office 3,237,599
Patented Mar. 1, 1966

3,237,599
ANIMAL CARE CASE
Frank R. Torrey, Silver Spring, Md., and Arthur W. Carlson, Muskegon, Mich., assignors to E. H. Sheldon & Company, Muskegon, Mich., a corporation of Michigan
Filed Sept. 25, 1964, Ser. No. 399,190
3 Claims. (Cl. 119—19)

This invention relates to an animal care case, and more particularly to a case which may be stored within a biology laboratory room.

Heretofore it has been found necessary to keep animals, such as guinea pigs, hamsters, rabbits, and other animals, in a separate animal room because of the need for special treatment, particularly over weekends, holidays, etc., and such room which involves substantial expense has to be maintained at additional expense, involving the presence of a caretaker, etc.

A primary object of the present invention is to eliminate the need fo ran animal room and the expense of maintaining the same, while providing an animal care case which may be kept in the laboratory room itself and in a sanitary manner. A further object is to provide a case which is readily accessible to students in a biology laboratory for the examination and treatment of test animals, while at the same time providing for the comfort and health of the animals, taking care of animal and chemical odors, and eliminating the need for the presence of a caretaker over weekend and holiday periods. Other specific objects and advantages will appear as the specification proceeds.

The invention is shown, in an illustrative embodiment, by the accompanying drawings, in which:

FIGURE 1 is a perspective view of a case embodying our invention; FIG. 2, a vertical sectional view on an enlarged scale, the section being taken as indicated at line 2—2 of FIG. 4; FIG. 3, a transverse sectional view, the section being taken as indicated at line 3—3 of FIG. 4; FIG. 4, a front view in elevation, a portion of the structure being broken away as indicated; and FIG. 5, a transverse sectional view, the section being taken as indicated at line 5—5 of FIG. 4.

In the illustration given, 10 designates a casing providing a vertical compartment or chamber 11. Secured to the front of the casing 10 are doors 12 and 13, each provided with glass through which the animals within the chamber may be observed. Mounted within the compartment 11 are spaced shelves 14 which are preferably perforated or formed with an open mesh body 15. The mesh body may be formed of expanded metal or in any other desired way, with the result that each shelf 14 has perforations or openings extending relatively uniformly over the shelves. Such shelves are adapted to receive cages having imperforate bottoms and in which test animals are housed.

The door-equipped casing 10 provides a sealed or closed chamber 11, and in order to admit air to the chamber we provide an air inlet passage 16 at the bottom of the casing. Above the passage 16 is provided a bottom or receptacle member 17 which extends across the major portion of the chamber but terminates short of the rear wall of the casing to provide a port 18 through which air may pass from the passage 16 into the chamber 11. The receptacle 17 is provided with a zinc or other suitable lining 19 and is exposed at the forward surface thereof when the doors 12 and 13 are opened so that droppings or other materials can be removed readily from the receptacle.

Mounted over the port 18 is an inclined baffle 20 which may be perforated or imperforate, as desired, the lower end of the baffle extending over the receptacle 17 so as to deflect particles into the receptacle 17.

The inlet pasage 16 is provided with a grille 21 placed within an opening in the forward lower portion of the casing 10, and mounted within the air inlet is an electric heater 22 controlled by a thermostat 23 in an upper portion of the casing.

In the upper portion of the casing, a transverse partition 24 closes the top of the casing and is provided with a depending bracket 25 on which the thermostat 23 is mounted. Above the transverse partition 24 is a blower compartment 26 in which is mounted a blower 27 supported upon bracket 28. The blower 27 has its intake pipe 29 extending through an opening in the transverse partition 24 and above the thermostat 23. The blower 27 has its outlet 30 opening upwardly toward the glass fiber filter 31 and the activated charcoal filterd 32 thereabove. The two filters are mounted upon a transverse partition 33 having a central opening 34 above the blower outlet.

The blower compartment or chamber 26 is mounted within a central casing 35, as shown best in FIG. 1, and storage compartments 36 and 37 are provided on either side of the casing 35 by the upper casing 38.

The casing 35 provides not only a blower compartment 26 but also an upper air outlet compartment 39, the front portion of casing 35 being provided with air outlet openings 40.

Storage compartment 36 is provided with a door 36a, and storage compartment 37 is provided with a door 37a. In order to facilitate the removal of the filters and the replacement of the filters, we provide within compartment 37 a frame 41 in which is slidably mounted a door 42. The door 42 may be raised to open the compartment 39 for the removal of used filters 31 and 32 and for the insertion of replacement filters.

Instruments for the control of the apparatus are preferably located on a panel 43 on casing 35. On the panel is provided a signal light 44, a blower switch 45, and a light switch 46.

The light switch 46 controls the operation of a fluorescent bulb 47 which is mounted in an upper compartment opposite thermostat 23, as shown best in FIG. 2.

Operation

In the operation of the apparatus, animal cages, preferably equipped with imperforate bottoms and containing test animals, are placed within the chamber 11 on the shelves 14. The thermostat 23 is set to a desired temperature and controls the operation of the electric heater 22. When the blower switch 45 is turned on, air is discharged upwardly through the filters 31 and 32 and at the same time air is drawn inwardly through the grille 21 and over the heater 22 which raises the temperature of the incoming air to that selected by the thermostat 23. The warmed air passing upwardly through port 18 into the chamber 11 expands rather uniformly through the chamber and moves upwardly through the chamber and about the animal cages (not shown) to the upper compartment from which the air, bearing odors, etc., is withdrawn by the blower 27. The withdrawn air is passed upwardly through the filter 31 formed of glass fibers or the like and thence upwardly through the activated charcoal filter 32 for the removal of odors and foreign material. The cleansed air is then discharged into the room through the forward openings 40. Particulate material escaping from the animal cages falls downwardly into the receptacle 17, the deflector 20 serving to protect the port 18 and the inlet passage 16.

The light or fluorescent lamp 47 may be turned on when needed to supply light for the health and needs of the animals. The cages of the animals may be supplied with food, and over weekends and vacation days the animals are kept in healthful condition and under warm and suitable tempeartures, with fresh air being supplied constantly to the case and with the laboratory room itself being kept fresh and free of animal and chemical odors.

While in the foregoing specification we have set forth a specific structure in considerable detail for the purpose of illustarting embodiments of our invention, it will be understood that such detail or details may be varied widely by those skilled in the art without departing from the spirit of our invention.

We claim:

1. An animal care case adapted for indoor use, comprising a door-equipped casing providing a vertical chamber, said chamber being provided at the lower portion thereof with an air inlet passage, a heater mounted in said passage, a plurality of open mesh shelves mounted in vertically spaced relation in said chamber, a transverse closure partition closing the upper portion of the casing and provided with a blower intake opening therethrough, a second transverse partition spaced above said first-mentioned closure partition and providing therebetween a blower compartment, said second partition being provided with a central opening, a top wall spaced above said second partition closing the top of said vertical compartment and providing with said second partition a filter compartment, filters supported in said filter compartment over said central opening in said second partition, and a blower supported in said blower compartment having an intake pipe extending through said opening in said first-mentioned closure partition and having its outlet opening in said blower compartment below said filters, said filter compartment being provided with filtered air discharge openings.

2. The structure of claim 1 in which the casing about said filter compartment is provided with an access opening for the removal and replacement of said filters, and a door is provided for normally sealing said access opening.

3. An animal care case adapted for use in a room, comprising a door-equipped casing providing a vertical closed chamber, said chamber being provided at the bottom thereof with an air inlet passage communicating with the bottom of the room, a heater mounted in said passage, a plurality of perforated shelves mounted in vertically spaced relation in said chamber, said chamber being provided in its upper portion with a transverse closure partition closing the upper portion of the casing, said partition being provided with a blower intake opening, a second partition in said casing spaced above said first-mentioned partition and providing therebetween a blower compartment, said second partition having a central opening, filters over said opening, a blower mounted in said blower compartment having an intake pipe extending through said opening in said first-mentioned closure partition and having its outlet opening in said compartment below said filters, a removable waste receptacle supported in the bottom of said chamber above said air passage but spaced from the rear wall of said chamber to provide a communication port between said passage and chamber, and a baffle carried by said rear wall and extending downwardly above said port and over said receptacle.

References Cited by the Examiner

UNITED STATES PATENTS

| | | | |
|---|---|---|---|
| 1,881,118 | 10/1932 | Bratton et al. | 119—35 |
| 1,893,918 | 1/1933 | Wilson | 119—37 |
| 2,335,173 | 11/1943 | Corey | 119—21 |
| 3,176,447 | 4/1965 | Omohundro et al. | 55—48 X |

FOREIGN PATENTS 15,743/33  12/1933  Australia.

SAMUEL KOREN, *Primary Examiner.*

HUGH R. CHAMBLEE, *Examiner.*